United States Patent
Bagagli et al.

(10) Patent No.: US 10,253,760 B2
(45) Date of Patent: Apr. 9, 2019

(54) ADJUSTING OPENING TIMES OF A CAM ACTUATED VALVE, RECIPROCATING COMPRESSOR AND METHOD

(71) Applicant: Nuovo Pignone Srl, Florence (IT)

(72) Inventors: Riccardo Bagagli, Florence (IT); Leonardo Tognarelli, Florence (IT)

(73) Assignee: Nuovo Pignone SRL, Florence (IT)

( * ) Notice: Subject to any disclaimer, the term of this patent is extended or adjusted under 35 U.S.C. 154(b) by 1080 days.

(21) Appl. No.: 14/398,105

(22) PCT Filed: May 1, 2013

(86) PCT No.: PCT/EP2013/059060
§ 371 (c)(1),
(2) Date: Oct. 30, 2014

(87) PCT Pub. No.: WO2013/164370
PCT Pub. Date: Nov. 7, 2013

(65) Prior Publication Data
US 2015/0139826 A1    May 21, 2015

(30) Foreign Application Priority Data
May 2, 2012    (IT) .............................. CO2012A0023

(51) Int. Cl.
*F04B 7/00*     (2006.01)
*F04B 39/10*    (2006.01)
(Continued)

(52) U.S. Cl.
CPC ............ *F04B 7/0057* (2013.01); *F04B 39/10* (2013.01); *F04C 14/24* (2013.01); *F16K 31/524* (2013.01)

(58) Field of Classification Search
CPC ...... F16K 31/524; F04B 7/0057; F04B 39/10; F04B 49/22; F04B 49/24; F04B 49/243; F04B 49/246; Y10T 137/86437
(Continued)

(56) References Cited

U.S. PATENT DOCUMENTS 3,986,484 A  * 10/1976  Dyer ........................ B60K 3/02
                                                    123/90.15
6,443,717 B1    9/2002  Barber
(Continued)

FOREIGN PATENT DOCUMENTS

CN    101315072 A    12/2008
CN    101749476 A    6/2010
(Continued)

OTHER PUBLICATIONS

Unofficial English Translation of Russian Office Action issued in connection with corresponding RU Application No. 014141996 dated Feb. 2, 2017.
(Continued)

*Primary Examiner* — Philip E Stimpert
(74) *Attorney, Agent, or Firm* — GE Global Patent Operation; Marc A. Vivenzio

(57) ABSTRACT

Cam actuated valves for compressors including mechanisms for changing an instant when the cam actuated valve is opened and/or a time interval during which the cam actuated valve is in an open state within the time range of a compression cycle. A reciprocating compressor has: a body including a compression chamber; a cam having an oblong portion, being located inside the body and being configured to be rotated around a rotation axis, to perform a rotation during each compression cycle; an actuating element located inside the body and configured to receive a linear displacement or an angular displacement due to the oblong portion
(Continued)

of the cam; and a valve located on a flow path of the fluid toward or from the compression chamber and configured to be switched to an open state by the actuating element. The reciprocating compressor also includes a controller configured to adjust timing of the valve.

6 Claims, 8 Drawing Sheets

(51) Int. Cl.
*F16K 31/524* (2006.01)
*F04C 14/24* (2006.01)

(58) Field of Classification Search
USPC .................................................. 74/567–569
See application file for complete search history.

(56) References Cited

U.S. PATENT DOCUMENTS

2007/0065302 A1* 3/2007 Schmitz ................. F04B 39/08
417/298
2010/0140519 A1 6/2010 Kopecek et al.

FOREIGN PATENT DOCUMENTS

| EP | 0384361 | A2 | 8/1990 |
| EP | 1998044 | A2 | 12/2008 |
| JP | 04187807 | A | 7/1992 |
| JP | 2001082118 | A | 3/2001 |
| JP | 2004353533 | A | 12/2004 |
| SU | 373447 | A1 | 3/1973 |
| SU | 396523 | A1 | 8/1973 |
| WO | 0188345 | A1 | 11/2001 |
| WO | 2007140283 | A2 | 12/2007 |
| WO | WO2007140283 | A2 * | 12/2007 |

OTHER PUBLICATIONS

Unofficial English Translation of Japanese Search Report issued in connection with corresponding JP Application No. 2015509427 dated Feb. 6, 2017.
Unofficial English Translation of Japanese Office Action issued in connection with corresponding JP Application No. 2015509427 dated Mar. 21, 2017.
"Camshaft and Variable Valve Timing", pp. 1-10, http://f1-dictionary.110mb.com/camshaft_VVT.html.
"How Camshaft Variable Valve Timing Works", pp. 1-6, http://www.2carpros.com/how_does_it_work/variable_cam_timing.htm.
"Different Types of VVT", pp. 1-4, http://www.autozine.org/technical_school/engine/vvt_31.htm.
Italian Search Report issued in connection with corresponding IT Application No. CO20120023 dated Jan. 10, 2013.
PCT Search Report and Written Opinion issued in connection with corresponding PCT Application No. PCT/EP2013/059060 dated Jun. 13, 2013.
Unofficial English translation of Office Action issued in connection with corresponding CN Application No. 201380023236.0 dated Dec. 15, 2015.

* cited by examiner

Figure 5
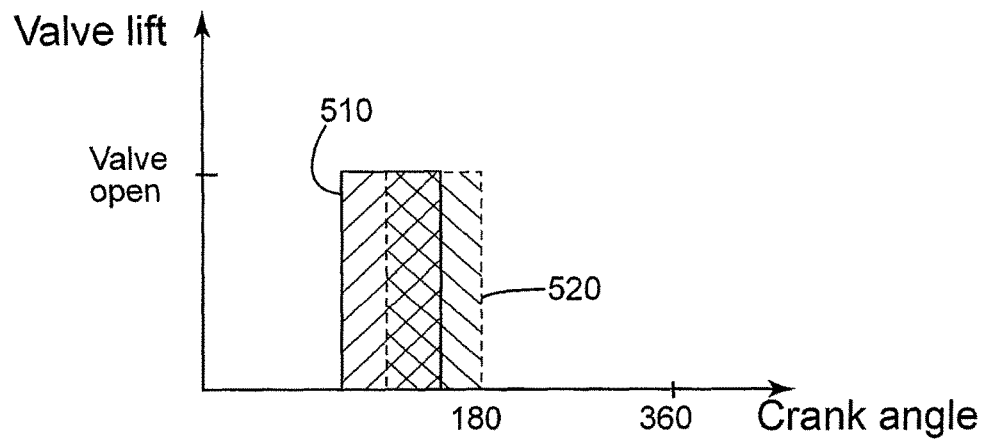
Figure 6A     Figure 6B
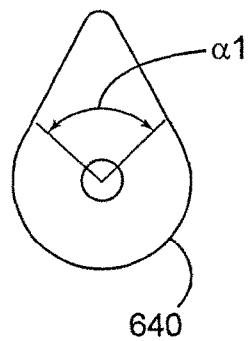  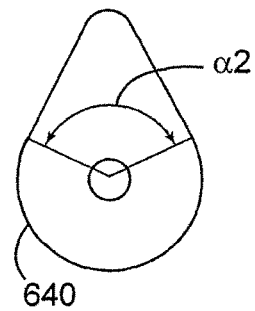
Figure 7
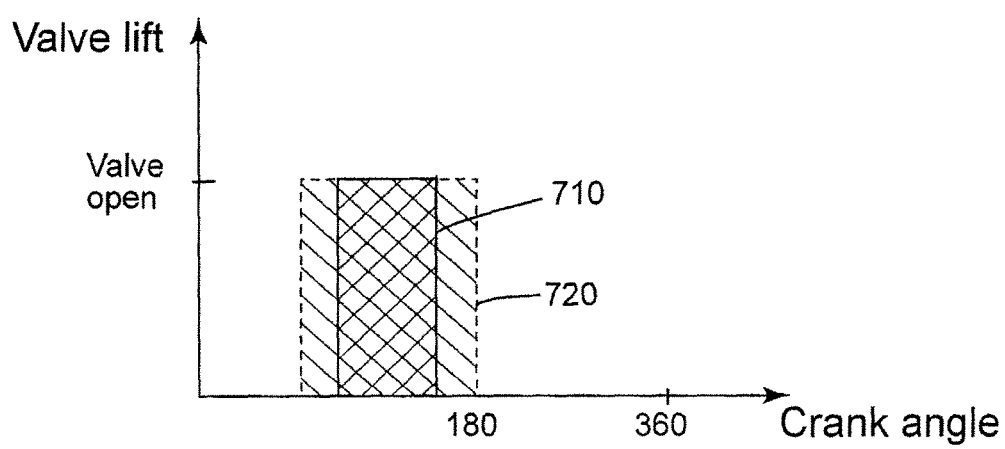

ADJUSTING OPENING TIMES OF A CAM ACTUATED VALVE, RECIPROCATING COMPRESSOR AND METHOD

BACKGROUND

Embodiments of the subject matter disclosed herein generally relate to cam actuated valves used in reciprocating compressors, and, more particularly, to mechanisms for changing, within the time range of a compression cycle, an instant when the cam actuated valve is opened and/or changing a time interval during which the cam actuated valve is in an open state.

Compressors are used in engines, turbines, power generation, cryogenic applications, oil and gas processing, etc., to increase a pressure of a fluid. One particular aspect that has to be considered for compressors used in the oil and gas industry is that the compressed fluid is frequently corrosive and flammable. American Petroleum Institute (API), the organization setting the recognized industry standard for equipment used in the oil and gas industry has issued a document, API618 (whose version as of June 2011 is included herewith by reference), listing a complete set of minimum requirements for reciprocating compressors. Thus, the valves and compressors to be discussed herein are considered to be in compliance with these requirements. In other words, it is believed that valves and compressors used in other industries, e.g., the auto industry, would not be considered by those skilled in the art to be analogous with the valves and compressors used in the oil and gas industry.

Conventionally, the valves used in a reciprocating compressor are automatic valves that are switched between a closed state (i.e., preventing a fluid to pass there-through) and an open state (i.e., allowing the fluid to pass there-through) due to a differential pressure across the automatic valve. Using actuated valves instead of automated valves has the benefit that the clearance volume (i.e., a part of the compression chamber volume from which compressed fluid cannot be discharged) occupied by the valves is reduced compared to the automated valves. However, actuation in these compressors requires large forces, large displacements and short response times, relative to respective ranges of parameters characterizing currently available actuators.

One mechanism that may be employed to provide the required large forces and short actuation times uses cams that are continuously rotated. One problem with this conventional mechanism is that the instant when the valve opens during a compression cycle and a time interval during which the valve is in an open state are fixedly determined based on an angular position and an angular span of the oblong portion of the cam that rotates to cause the displacement actuating the valve.

It would be desirable to provide valve assemblies and methods for cam actuated valves in reciprocating compressors that allow adjusting the instant when the cam actuated valve opens during a compression cycle, and/or a time interval during which the valve is in an open state.

SUMMARY

Some embodiments provide valve actuating mechanisms including cams and related methods that enable adjustment of timing (i.e., the instant when the valve opens during a compression cycle, and/or a time interval while the valve is in an open state) for cam actuated valves. Being able to adjust the valve timing provides the advantage of flexibility, thereby enabling optimization of the compression cycle for different working fluids and/or compression conditions.

According to one exemplary embodiment, there is a reciprocating compressor configured to execute compression cycles to compress a fluid. The reciprocating compressor includes (A) a body including a compression chamber inside which the fluid is compressed (B) a cam having an oblong portion, the cam being located inside the body and being configured to be rotated around a rotation axis, to perform a rotation during each compression cycle, (C) an actuating element located inside the body and configured to receive a linear displacement or an angular displacement due to the oblong portion of the cam, and (D) a valve located on a flow path of the fluid toward or from the compression chamber and configured to be switched to an open state by the actuating element. The reciprocating compressor also includes a controller configured to adjust an instant during a compression cycle when the valve is opened.

According to another exemplary embodiment, there is a reciprocating compressor configured to execute compression cycles. The reciprocating compressor has (A) a body including a compression chamber inside which the fluid is compressed, (B) a cam having an oblong portion, the cam being located inside the body and being configured to be rotated around a rotation axis, to perform a rotation during each compression cycle, (C) a stem located inside the body and configured to be maintained in contact with the cam, to perform a linear motion relative to the rotation axis, and (D) a valve configured to be switched between an open state and a closed state due to the linear motion of the stem. The reciprocating compressor also includes a controller configured to adjust, within a period of the compression cycle, a time interval during which the valve is in an open state.

According to another exemplary embodiment, there is a method of adjusting timing of a valve of a reciprocating compressor. The method includes providing a cam having a profile configured such that at least one of (1) an angular position of an oblong portion and (2) an angle spanned by the oblong portion to vary smoothly along a rotation axis of the cam. The method also includes changing a position along the cam the rotation axis at which a shaft is maintained in contact with the cam, to achieve, after the changing, at least one of (1) the oblong portion of the cam to be at a final angular position different from an initial angular position of the oblong portion of the cam, and (2) a final angle spanned by the oblong portion to be different from an initial angle spanned by the oblong portion.

According to another exemplary embodiment, there is a cam mechanism useable to actuate a valve that is located on a flow path of a fluid toward or from a compression chamber of a reciprocating compressor. The cam mechanism includes a cam configured to be rotated around a rotation axis, to perform a rotation during each compression cycle, and having a profile such that outer walls of the cam are not parallel to a rotation axis thereof. The cam mechanism further includes an actuating element configured to receive a linear displacement or an angular displacement due to an oblong portion of the cam, to switch the valve to an open state. The cam mechanism also includes a controller configured to adjust an instant during each compression cycle when the valve is opened.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 5 is a graph illustrating the effect of changing the instant when the valve is opened according to an exemplary embodiment;

FIGS. 6A and 6B are cross-sections of a cam having a non-conventional three-dimensional profile according to another exemplary embodiment;

FIG. 7 is graph illustrating the effect of changing a time interval during which the valve is in an open state according to an exemplary embodiment;

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of cam actuated valves for reciprocating compressors used in the oil and gas industry. However, the embodiments to be discussed next are not limited to these compressors, but may be applied to other compressors.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
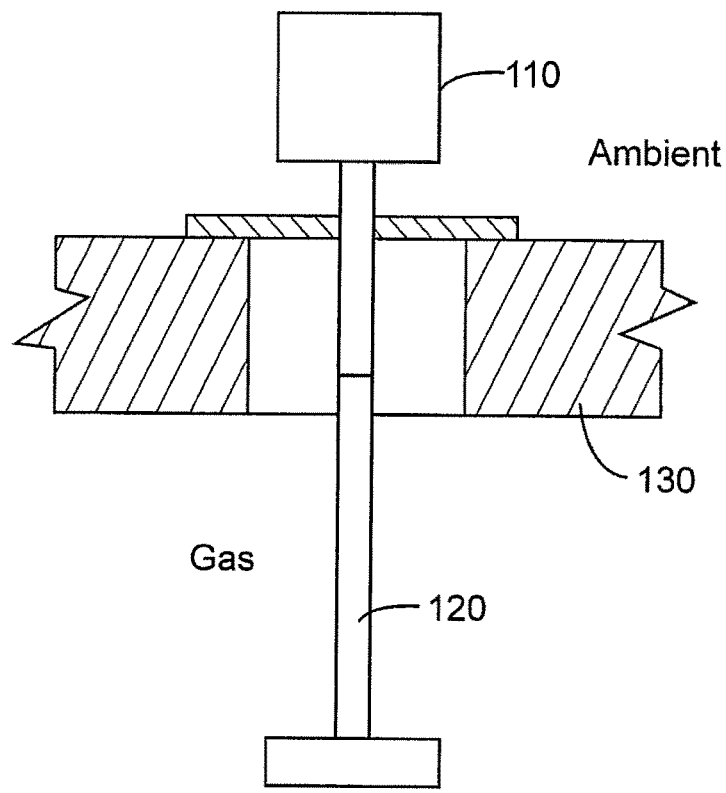
FIG. 1 is a schematic diagram of an actuation assembly according to an exemplary embodiment.

One objective of embodiments described hereinafter is to provide cam actuated valves for reciprocating compressors with adjustable timing and related methods. In the oil and gas industry, an actuator 110, which is often an electric motor, is, in an embodiment, located outside the compressor body 130 in order not to be in contact with the working fluid (that may be flammable), as illustrated in FIG. 1. A shaft 120 (that may be rotated or moved linearly) penetrates the compressor body 130 to transmit the actuating motion generated by the actuator 110.

Figure 2:
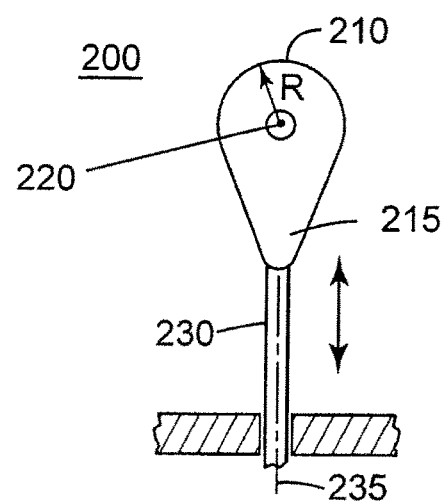
FIG. 2 is a cam mechanism according to an exemplary embodiment.

FIG. 2 illustrates a cam mechanism 200 including a cam 210 that may rotate continuously around a rotation axis 220, for example, performing a full rotation during each compression cycle of the reciprocating compressor. The cam 210 has an oblong portion 215 extending away from the rotation axis 220 (i.e., a distance from any point of the oblong portion 215 to the rotation axis 220 is larger than a radius R of the rest of the cam 210). A stem 230 is maintained in contact with the cam's circumference while remaining oriented along the axis 235. The stem 230 may be pushed toward the cam 210 by a return force due to a pressure difference at opposite ends of the stem 230 or by another return mechanism, which may be as simple as a spring (but which may have various other embodiments). While the cam 210 rotates, the stem 230 performs a linear motion during which the stem 230 is pushed away from the rotation axis 220 and then slides back toward the rotation axis 220. This linear motion may be used to actuate a linear valve or may be converted into an angular displacement to actuate a rotary valve.

Figure 3:
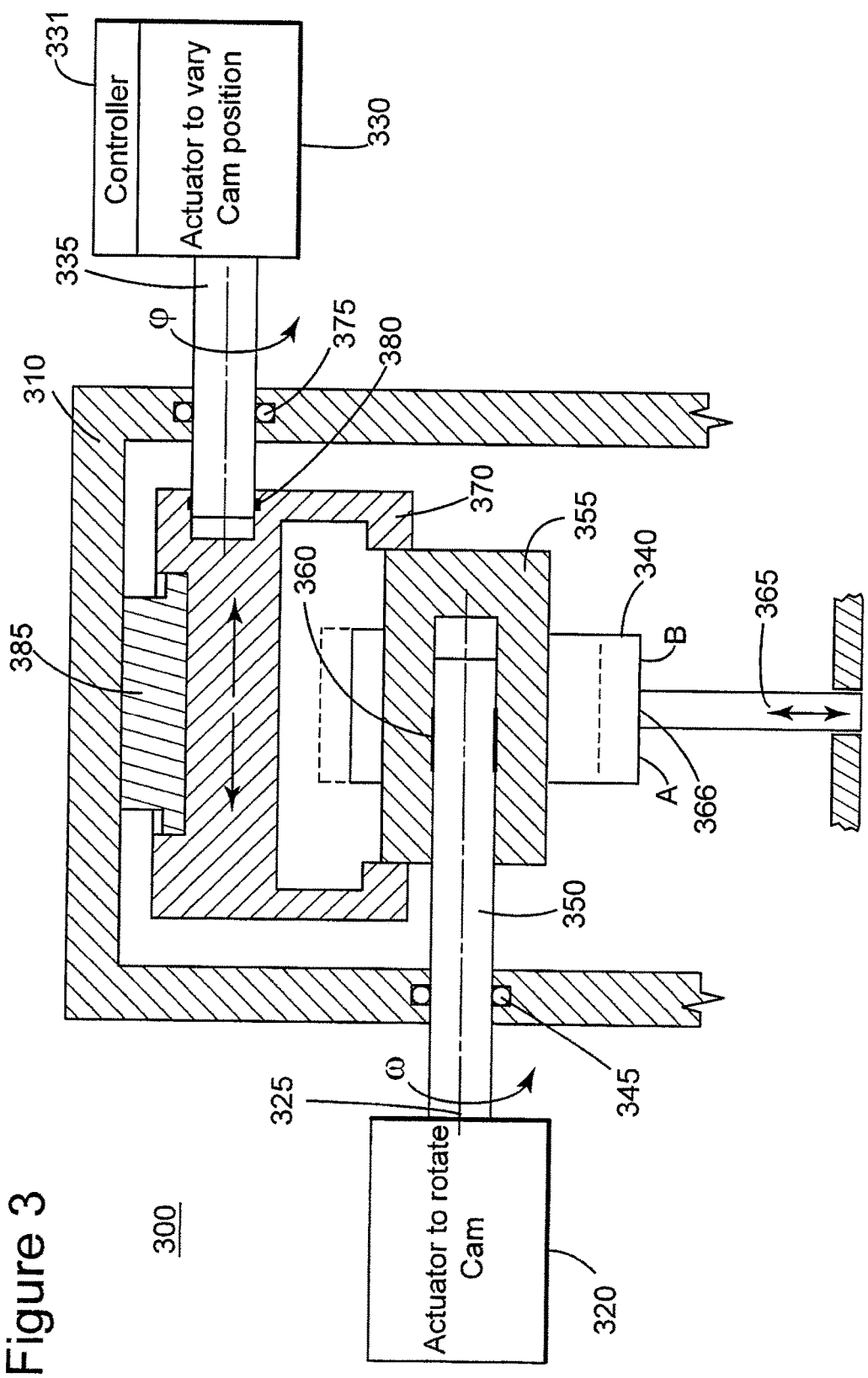
FIG. 3 is a schematic diagram of a cam mechanism according to an exemplary embodiment.

FIG. 3 is a schematic diagram of a mechanism 300 useable to actuate a linear valve of a reciprocating compressor. Actuators 320 and 330 (e.g., electric motors) configured to provide a rotation motion and an angular displacement, respectively, are located outside the compressor body 310.

The cam actuator 320 provides a rotation motion characterized by an angular speed w around a rotation axis 325. This rotation motion is transmitted to the cam 340 via a cam shaft 350 penetrating the compressor body 310. A seal 345 prevents the working fluid inside the reciprocating compressor 310 from leaking outside thereof, at the location where the cam shaft 350 penetrates the compressor body 310. The cam 340 executes a rotation during each compression cycle.

A valve stem 365 is maintained in contact with the circumference of the cam 340. As the cam 340 rotates, the valve stem 365 performs a linear motion (as suggested by the up and down arrow on the valve stem 365) relative to the rotation axis 325. That is, when the oblong portion of the cam 340 is oriented toward the valve stem 365 below the axis 325, as illustrated using the continuous line, the valve stem 365 is farther away from the axis 325. When the oblong portion is oriented in an opposite direction, away from the valve stem 365, above the axis 325, as illustrated using the dashed line, the valve stem is closer to the axis 325.

While the reciprocating compressor performs compression cycles, the cam 340 that is mounted on a cam holder 355 is at fixed longitudinal and axial positions relative to the cam shaft 350. However, while the reciprocating compressor does not perform compression cycles, the cam 340 and the cam holder 355 may be moved relative to the cam shaft 350.

In one embodiment, a longitudinal shift is enabled by the presence of intertwined axial grooves 360 on an inner surface of the cam holder 355 and on an outer surface of the cam shaft 350. As a result of changing the longitudinal position of the cam 340 relative to the cam shaft 350, a contact point 366 between the valve stem 365 and the cam 340 moves along the cam 340, in the range between a position A and a position B.

The cam holder 355 moves longitudinally (i.e., parallel to the axis 325) when a cam holder slide 370 is moved longitudinally due to an angular displacement generated by the cam position actuator 330. The cam position actuator 330 includes (or it is controlled by) a controller 331 configured to initiate the actuating angular displacement that triggers the linear displacement of the cam holder slide 370. The cam position actuator 330 rotates a cam position actuation shaft 335 penetrating the compressor body 310. A seal 375 prevents the fluid inside the reciprocating compressor from leaking outside thereof at the location where the cam position shaft 335 penetrates the body 310. The rotation of the cam position actuation shaft 335 is converted into a longitudinal displacement of the cam holder slide 370 (as suggested by the left and right arrows) due to the presence of a coupling 380 (e.g., an external thread on the shaft 335 and an inner thread on the cam holder slide 370) between the cam position actuation shaft 335 and the cam holder slide 370. A guide piece 385 interfaces with the cam holder slide 370 and the inner wall of the compressor body 310. One may consider that the actuator 330, the cam position actuation shaft 335, the cam holder slide 370, the guide piece 385, and the cam holder 355 are all components of a controller configured to adjust an instant when the valve is opened.

Figure 4:
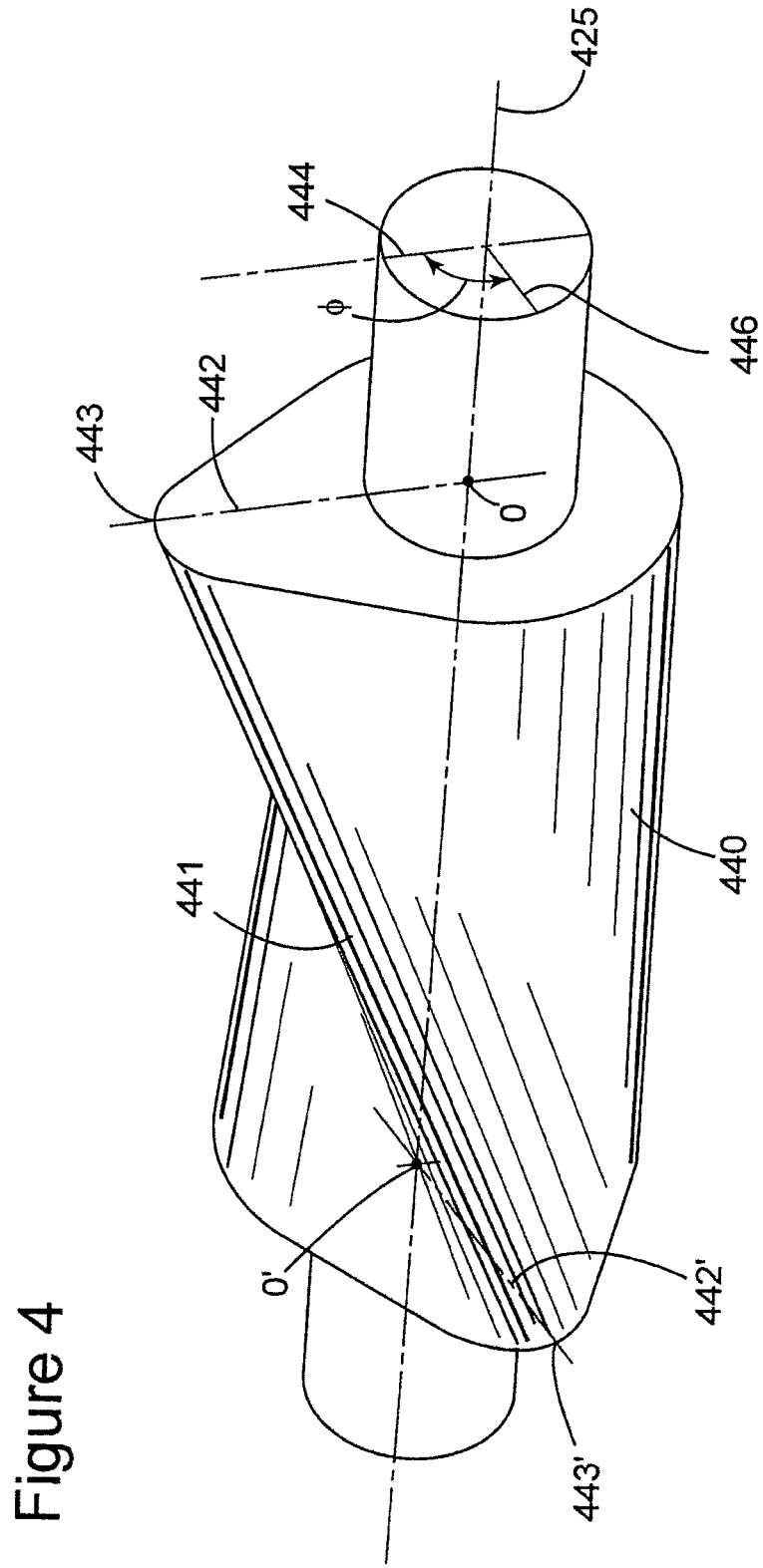
FIG. 4 is an illustration of a non-conventional three-dimensional cam profile according to an exemplary embodiment.

In this embodiment, the cam 340 has a non-conventional three-dimensional profile as illustrated in FIG. 4, such that, in some cross-sections of the cam 440 including the rotation axis 425, the outer walls of the cam are not parallel to the rotation axis thereof. Conventionally, a cam has outer walls substantially parallel to its rotation axis in all the cross sections including the rotation axis.

In a cross-section of the cam 440 perpendicular to the rotation axis 425, consider a line connecting a point where the rotation axis 425 intersects the cross-section and a point on the cam's circumference, which is farthest from the rotation axis 425. An angular position of the oblong portion 441 in this cross-section is the angle of this line with a reference direction (the reference direction being independent of the cross-section).

The angular position of the oblong portion 441 of the cam 440 in FIG. 4 varies for different cross-sections along the rotation axis 425. For example, in the cross-section that is perpendicular to the rotation axis 425 on the right side of the cam profile, a line 442 connects a point O (where the rotation axis 425 intersects this cross-section) and a point 443, which is a point on the cam's circumference that is farthest from the point O. If the reference direction is the line 444, which is parallel to the line 442, the angular position of the oblong portion 441 in the cross-section on the right side of the cam 440 is 0. If a line 446 is parallel to a line 442' connecting a point O' where the rotation axis 425 intersects a cross-section on the left side of the cam 440, and a point 443' on the cam's circumference that is farthest from the rotation axis 425 in this left side cross-section, the angular position of the oblong portion 441 in the left-side cross-section is Φ. The angular position of the oblong portion 441 varies smoothly for different cross-sections along the cam's length, between 0 and Φ. The oblong portion has the same one angular position for all the cross-sections along a conventional cam's length.

Due to this non-conventional three-dimensional profile, when the cam 340 is shifted along its rotation axis, in a cross-section of the cam perpendicular to the rotation axis, at a contact point with the valve stem 365, a final angular position of the oblong portion after the cam has been shifted is different from an initial angular position (prior to shifting the cam) thereof.

FIG. 5 graphically illustrates the effect that a change of the angular position of the oblong portion has on the instant when the valve is opened. The x axis of the graph represents angular values of a crank angle corresponding to a time during a compression cycle (a crankshaft making a full rotation 0-360 during each cycle of the compressor). The y axis of the graph illustrates the valve state. Before adjusting the cam position along its axis, the valve stays open for a predetermined period as illustrated by the continuous line 510. When the cam position is shifted along the rotation axis, resulting in a change of the angular position of the oblong portion, the valve stays open for the same period of time, but it is opened at another instant during the process, different from the instant at which it was opened before the cam being shifted, as illustrated by the dashed line 520.

Thus, an instant at which the valve is opened is adjusted by adjusting an angular position of the oblong portion.

In another embodiment, the cam 340 has a conventional profile, but may be rotated relative to the cam shaft 350 due to helical gears 360, that replace the axial grooves in the previous embodiment. The helical gears 360 are located the between the cam shaft 350 and the cam holder 355, and convert a translation of the cam holder 355 (e.g., being pushed by the cam holder slide 370) into a rotation thereof relative to the cam shaft 350. In this case, bushings (not shown) may be placed between the cam holder 355 and the cam holder slide 370 to carry the axial throw of the helical gears 360 during regular operation, thereby, to avoid transmitting a tangential force to the cam holder slide 370.

Thus, the instant when the valve is opened during a compression cycle may be adjusted by (1) moving a contact point of the valve stem and a cam along the cam's length, when the cam has a non-conventional profile with the angular position of the oblong part varying along the cam's length, or (2) changing the angular position of the oblong portion of a regular cam, when helical gears enable the cam to have an angular displacement relative to the cam shaft.

According to another embodiment, a cam 640 may have another type of non-conventional profile with outer walls thereof also not parallel to the rotation axis. For the cam 640, an angle spanned by an oblong portion of the cam varies along the cam's length. The angle spanned by the oblong portion is defined by the lines connecting the points on the cam's circumference separating the oblong portion (where a distance from a point on the circumference to the rotation center O becomes larger than a radius of the cam) from the rest of the cam. FIG. 6A illustrates a cross-section of the cam 640 perpendicular to the rotation axis thereof in which the oblong portion spans a first angle $\alpha_1$, and FIG. 6B illustrates another cross-section of the cam in which the oblong portion spans a second angle $\alpha_2$ that is larger than $\alpha_1$ ($\alpha_1 < \alpha_2$). The angle spanned by the oblong portion varies smoothly (i.e., not stepwise) along the length of cam 640. In contrast, a conventional cam has a profile with outer walls parallel to the rotation axis, and the angle spanned by the oblong portion constant along its length.

If the cam rotates with a constant angular speed, the difference in the angle spanned by the oblong portions causes a difference in the time interval during which the valve is in an open state, as graphically illustrated in FIG. 7. The axes of the graph in FIG. 7 have the same significance as the ones in FIG. 5. The continuous line 710 corresponds to a time interval during which the valve is in an open state if the contact point of the valve stem with the cam is in a portion where the oblong portion spans the first angle $\alpha_1$. The dashed line 720 corresponds to a time interval during which the valve is in an open state if the contact point of the valve stem with the cam is in a portion where the oblong portion of the cam spans the second angle $\alpha_2$.

In one embodiment, the oblong portion has the same angular position along the cam's length, while the angle spanned by the oblong position varies along the cam's length. However, in other embodiments, the non-conventional profile may combine (along the cam's length) the variation of the angular position of the oblong position and the variation of the angle spanned by the oblong portion.

A change of the time interval during which the valve remains in an open state during a compression cycle may also be achieved by varying an angular speed of a regular cam, e.g., by rotating the cam slower or faster than an average angular speed while the valve stem is in contact with the oblong portion thereof. Since the duration of the compression cycle remains the same, the cam is rotated faster or slower, respectively, than an average angular speed while the valve stem is not in contact with the oblong portion thereof. That is, during each compression cycle, the angular speed of the rotation motion of the cam around the rotation axis has at least two different values. In this case, the controller controls the actuator (e.g., electric motor) that causes the cam to rotate. The controller may be located inside this actuator or may be connected to this actuator. The variation of the angular speed of the cam appears to revive the technical challenge of small actuation times and large forces, which has been solved by using constantly rotating cams. However, the forces required for varying the angular speed are smaller than forces necessary to cause a linear or angular displacement from a static situation.

Figure 8A:
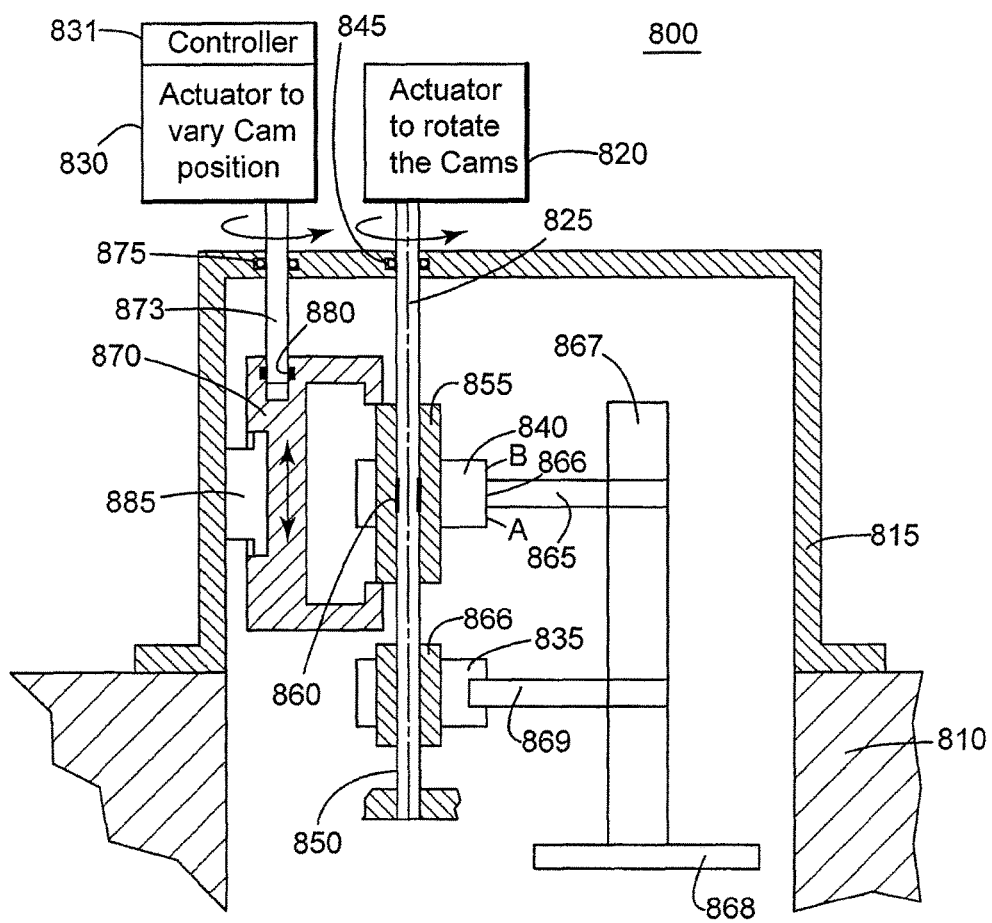
FIGS. 8A and 8B are schematic diagrams of a cam mechanism according to another exemplary embodiment.
Figure 8B:
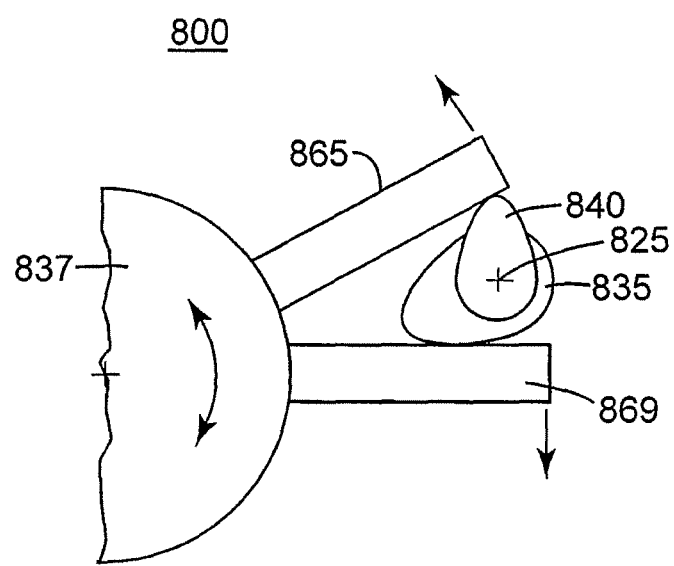

According to another exemplary embodiment illustrated in FIGS. 8A and 8B, a rotary valve actuation mechanism 800 includes actuators 820 and 830, (e.g., electrical motors) that are located outside the compressor body 810. The cam actuator 820 rotates a cam shaft 850, which penetrates a cover 815 of the compressor body 810. A seal 845 prevents the working fluid from leaking outside of the compressor body 810 at the location where the cam shaft 850 penetrates the cover 815. The cam shaft 850 transmits the rotation motion around the axis 825 to cams 835 and 840. The cams 835 and 840 execute a rotation during each compression cycle.

While rotating the cams 835 and 840, the oblong portions thereof move arms 865 and 869, respectively, in the manner illustrated in FIG. 8B. The oblong portions of the cams 835 and 840 move the arms 865 and 869 at different instants during the compression cycle to achieve opening and closing the rotary valve having a valve shaft 868 connected to the valve rotor (not shown). The cam 840 and the arm 865 are also known as the opening cam and the opening arm, respectively. The cam 835 and the arm 869 are also known as the closing cam and the closing arm, respectively.

While the reciprocating compressor performs compression cycles, the cam 840, which is mounted on a cam holder 855, is at a fixed position along the cam shaft 850. However, while the reciprocating compressor does not perform compression cycles, the cam 840 and the cam holder 855 may be moved relative to the cam shaft 850.

Similar to the embodiments described relative to FIG. 3, if the cam 840 has a non-conventional 3-D profile as illustrated in FIG. 4, axial grooves 860 on the cam holder 855 and the cam shaft 850, allow the cam 840 and the cam holder 855 to be shifted along the rotation axis 825. Alternatively, if the cam 840 has a conventional profile, helical gears 860 between the cam holder 855 and the cam shaft 850 allow the cam 840 and the cam holder 855 to be rotated relative to the cam shaft 850. The cam holder 855 does not move while the reciprocating compressor performs compression cycles, thus maintaining positions of the cam 840 relative to the cam shaft 850. In either alternative embodiments, the result of changing the (longitudinal or angular) position of the cam 840 relative to the cam shaft results in changing an instant when the valve is opened.

The cam holder 855 and the cam 840 move relative to the cam shaft 850 when a cam holder slide 870 is moved longitudinally due to an angular displacement generated by the cam position actuator 830. The cam position actuator 830 includes (or it is controlled by) a controller 831 configured to initiate the actuating angular displacement that triggers the linear displacement of the cam holder slide 870.

The cam position actuator 830 rotates a cam position actuation shaft 873 penetrating the cover 815. A seal 875 prevents the fluid inside the reciprocating compressor from leaking outside thereof at the location where the cam position actuation shaft 873 penetrates the cover 815. The angular displacement of the cam position actuation shaft 873 is converted into a longitudinal displacement of the cam holder slide 870 (as suggested by the left and right arrows) due to the presence of a coupling 880 between the cam position actuation shaft 873 and the cam holder slide 870. A guide piece 885 interfaces the cam holder slide 870 and the inner wall of the compressor body 810.

Thus, when the longitudinal or angular position of cam 840 relative to the cam shaft 850 is changed, an instant when the valve is opened changes. In the embodiment illustrated in FIG. 8A, an instant when the valve is closed remains the same, and, therefore, this change of the instant when the valve is opened also modifies a time interval during which the valve is in an open state.

However, in another embodiment, mechanisms similar to the mechanisms discussed above for adjusting an instant when the valve is opened may be present for adjusting an instant when the valve is closed. In this case, changing one or both instants when the valve is opened and when the valve is closed allows adjusting or only shifting the duration of the valve being in an open state.

Figure 9:
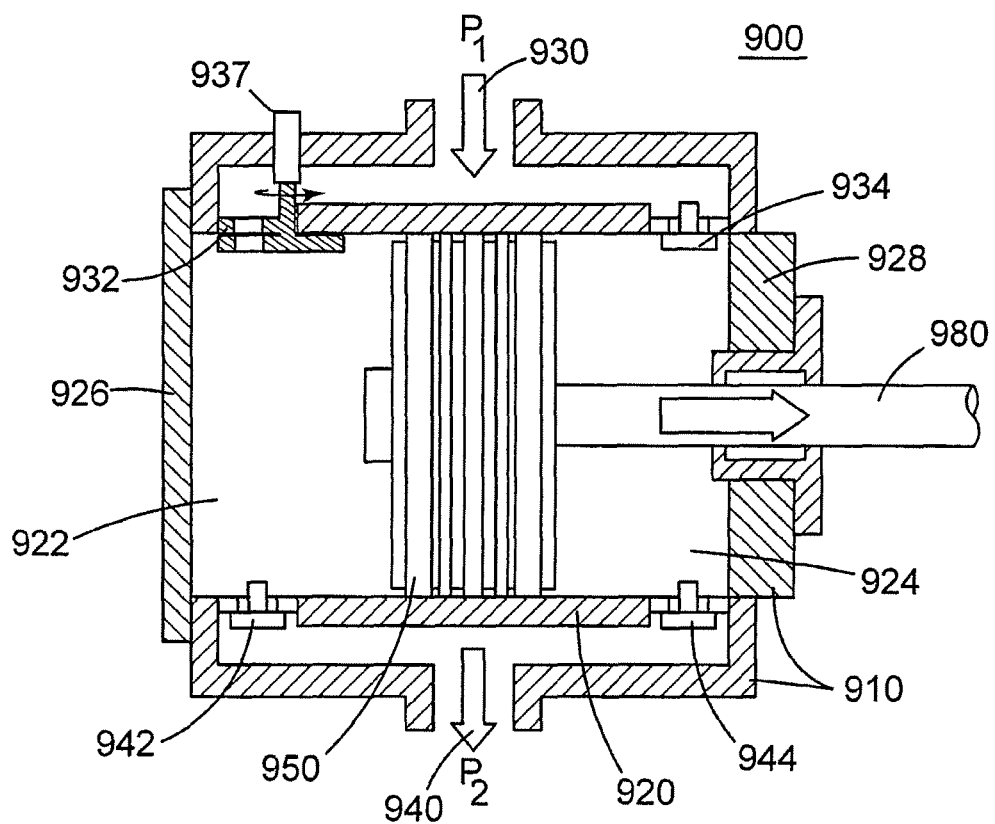
FIG. 9 is a schematic diagram of a reciprocating compressor according to another exemplary embodiment.

Valves actuated with cam mechanisms enabling timing adjustments as described above may be used in a dual reciprocating compressor 900 as illustrated in FIG. 9. However, the valves actuated by mechanisms including cams may also be used in single chamber reciprocating compressors.

The compressor 900 is a dual chamber reciprocating compressor having a compressor body 910. The compression occurs inside compression chambers 922 and 924 of the compressor 900. The working fluid having a first pressure $P_1$ flows inside the compression chambers 922 and 924 through an inlet 930 when suction valves 932 or 934 are opened. The compressed fluid having a second pressure $P_2 > P_1$ is discharged from the compression chambers 922 and 924 to an outlet 940 when discharge valves 942 or 944 are opened. The fluid compression occurs due to the back-and-forth movement of the piston 950 between a head end 926 and a crank end 928. The compression chambers 922 and 924 operate in different phases of the cyclic compression process, the volume of compression chamber 922 being at its lowest value when the volume of compression chamber 924 is at its highest value and vice-versa. The piston 950 moves due to the energy received, for example, from a crankshaft (not shown) via a crosshead (not shown) and a piston rod 980. In FIG. 9, the valves 932, 934, 942, and 944 are illustrated as being located on a side wall of the compression body 920. However, the valves 932, 942, 934 and 944, may be located on the head end 926 and/or the crank end 928, respectively.

In contrast to an automatic valve (which is switched between being opened and being closed depending on a differential pressure on opposite sides of a mobile part of the valve), the valve 932 is a cam actuated rotary valve that opens upon receiving an angular displacement from the mechanism 937 in FIG. 9. The mechanism 937 includes a cam (not shown) and may be similar to the mechanism 800 illustrated in FIGS. 8A and 8B, being configured to provide an angular displacement to a valve stem in order to open and close the rotary valve 932. In an alternative embodiment, instead of the rotary valve, a linear valve may be actuated by a mechanism similar to the mechanism 300 in FIG. 3.

One or more valves of the reciprocating compressor 900 may be cam actuated valves. Some embodiments may include a combination of cam actuated valves and automatic valves, even if all the cams are cam actuated, only some of the cams are configured to be able to adjust timing of the valve. For example, the suction valves (e.g., 932, 934) may be cam actuated valves configured to be able to adjust timing of the valve, while the discharge valves (e.g., 942, 944) may be automatic valves.

Besides being configured to actuate the valve 932, the mechanism 937 is also configured to be able to change an instant during the compression cycle when the valve is opened and/or a time interval during which the valve is in an open state.

Figure 10:
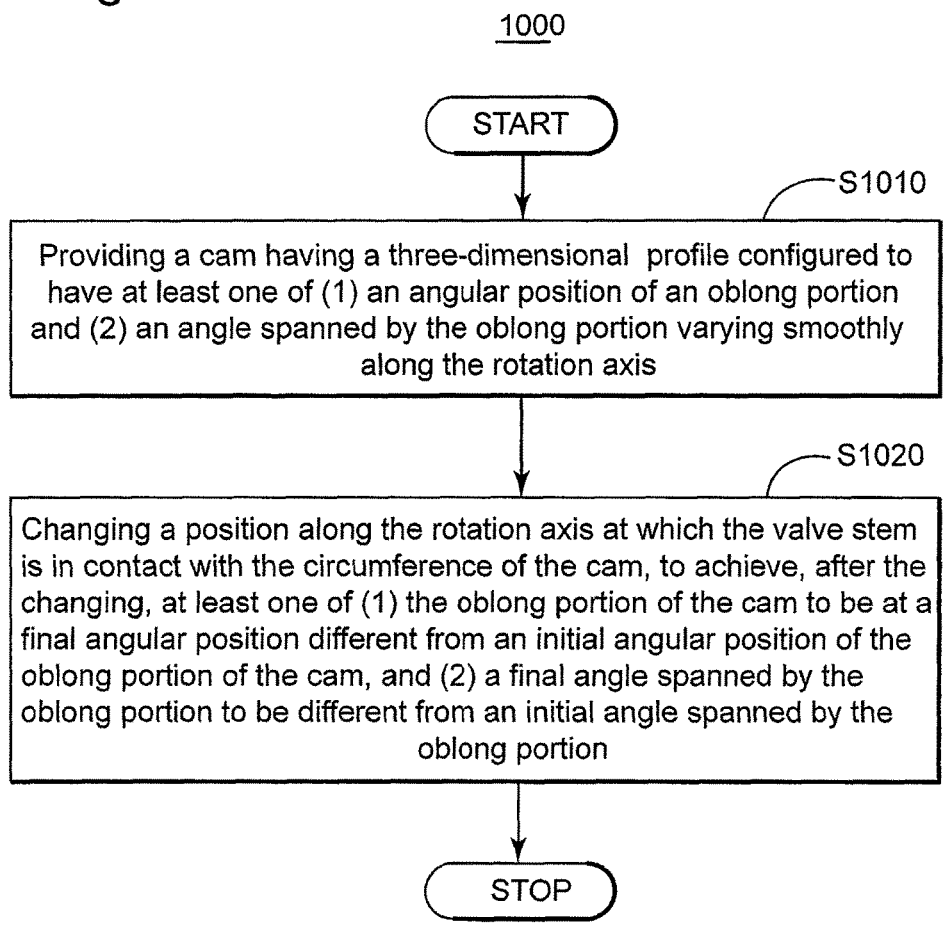
FIG. 10 is a flowchart illustrating a method of adjusting timing characteristics of opening a valve of a reciprocating compressor according to an exemplary embodiment.

FIG. 10 is a flowchart of a method 1000 of adjusting timing characteristics of opening a valve of a reciprocating compressor according to an exemplary embodiment. The method 1000 includes providing a cam having a three-dimensional profile configured to have at least one of (1) an angular position of an oblong portion and (2) an angle spanned by the oblong portion varying smoothly along a rotation axis, at S1010. Further, the method 1000 includes changing a position along the rotation axis at which the valve stem is in contact with the circumference of the cam, to achieve, after the changing, at least one of (1) the oblong portion of the cam to be at a final angular position different from an initial angular position of the oblong portion of the cam, and (2) a final angle spanned by the oblong portion to be different from an initial angle spanned by the oblong portion, at S1020.

The method 1000 may further include rotating the cam relative to a cam shaft configured to transmit a rotation motion to the cam to change an angular position of the oblong portion. Also, the method 1000 may include changing duration of the linear motion by varying an angular speed of the cam rotating around the rotation axis to have at least two different angular speed values during each compression cycle.

The disclosed exemplary embodiments provide valve assemblies including cams and related methods for actuating valves in reciprocating compressors used in the oil and gas industry. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A reciprocating compressor configured to execute compression cycles to compress a fluid comprising:
   a body comprising a compression chamber inside which the fluid is compressed;
   a cam comprising an oblong portion, the cam located inside the body and configured to rotate about a rotation axis to perform a rotation during each of the compression cycles, wherein the cam further comprises a profile configured to have an angular position of the oblong portion in cross-sections along the rotation axis varying smoothly;
   an actuating element located inside the body and configured to receive a linear displacement or an angular displacement due to the oblong portion of the cam;
   a valve located on a flow path of the fluid toward or from the compression chamber, the valve configured to be switched to an open state by the actuating element; and
   a controller configured to (i) adjust, via the actuating element, an instant when the valve is opened during a given one of the compression cycles, and (ii) adjust a time interval during which the valve is in the open state by controlling an angular speed of the cam rotating around the rotation axis to have at least two different angular speed values during each compression cycle, a first angular speed while the actuating element is in contact with the oblong portion of the cam and a second angular speed otherwise.

2. The reciprocating compressor of claim 1, wherein the controller is further configured to initiate an angular displacement to move the cam along the rotation axis such that a final angular position of the oblong portion of the cam differs from an initial angular position of the oblong portion of the cam in a cross-section of the cam perpendicular to the rotation axis.

3. The reciprocating compressor of claim 1, wherein the controller comprises:
   an actuation mechanism configured to move the cam along the rotation axis upon receiving the angular displacement; and
   a cam position actuator located outside the body and configured to provide the angular displacement to the actuation mechanism.

4. The reciprocating compressor of claim 1, wherein:
   the cam comprises a profile configured such that an angle spanned by the oblong portion varies along the rotation axis, and
   the controller is further configured to initiate a movement of the cam along the rotation axis, such that, at a location where the stem is in contact with the cam, the oblong portion spans a final angle after the movement different from an initial angle spanned prior to the movement.

5. A reciprocating compressor configured to execute compression cycles to compress a fluid comprising:
   a body comprising a compression chamber inside which the fluid is compressed;
   a cam comprising an oblong portion, the cam located inside the body and configured to rotate about a rotation axis to perform a rotation during each of the compression cycles, wherein the cam further comprises a profile configured to have an angular position of the oblong portion in cross-sections along the rotation axis varying smoothly;
   an actuating element located inside the body and configured to receive a linear displacement or an angular displacement due to the oblong portion of the cam;
   a valve located on a flow path of the fluid toward or from the compression chamber, the valve configured to be switched to an open state by the actuating element; and a controller configured to adjust, via the actuating element, an instant when the valve is opened during a compression cycle, the controller comprising an actuation mechanism configured to move the cam along the rotation axis upon receiving the angular displacement, and a cam position actuator located outside the body and configured to provide the angular displacement to the actuation mechanism, wherein the actuation mechanism comprises:

a cam position actuation shaft configured to rotate according to the angular displacement and mounted to have one end outside the body, the one end being connected to the cam position actuator, and another end inside the body;

a cam holder slide located inside the body and in contact with the another end of the cam position actuation shaft, the cam holder slide coupled to the cam position actuation shaft such that the cam holder slide is displaced linearly substantially parallel to the rotation axis of the cam when the cam position actuation shaft is rotated; and a cam holder mounted in contact with the cam holder slide and configured to move together with the cam longitudinally relative to a cam shaft that causes the cam to rotate during compression cycles when the cam holder slide has the linear displacement.

6. A reciprocating compressor configured to execute compression cycles to compress a fluid comprising:

a body comprising a compression chamber inside which the fluid is compressed;

a cam comprising an oblong portion, the cam located inside the body and configured to rotate about a rotation axis to perform a rotation during each of the compression cycles, wherein the cam further comprises a profile configured to have an angular position of the oblong portion in cross-sections along the rotation axis varying smoothly;

an actuating element located inside the body and configured to receive a linear displacement or an angular displacement due to the oblong portion of the cam;

a valve located on a flow path of the fluid toward or from the compression chamber, the valve configured to be switched to an open state by the actuating element;

a cam shaft configured to cause the cam to rotate during the compression cycles; and a controller configured to (i) adjust, via the actuating element, an instant when the valve is opened during a compression cycle, and (ii) cause the cam to selectively rotate relative to the cam shaft to change an angular position of the oblong portion at a location where the actuating element is in contact with the cam, the controller comprising:

a cam position actuator located outside the body and configured to provide an angular displacement;

a cam position actuation shaft configured to rotate according to the angular displacement and mounted to have one end outside the body, the one end connected to the cam position actuator, and another end inside the body;

a cam holder slide located inside the body and in contact with the other end of the cam position actuation shaft, the cam holder slide coupled to the cam position actuation shaft such that the cam holder slide is displaced linearly substantially parallel to the rotation axis of the cam when the cam position actuation shaft is rotated; and a cam holder mounted in contact with the cam holder slide and configured to rotate together with the cam relative to the cam shaft when the cam holder slide has the linear displacement.

* * * * *